April 30, 1957 E. P. WENZELBERGER 2,790,309
AUTOMATIC TANK DUMP VALVE MECHANISM
Filed July 19, 1954

INVENTOR.
ELWOOD P. WENZELBERGER
BY
ATTORNEYS

United States Patent Office 2,790,309
Patented Apr. 30, 1957

2,790,309

AUTOMATIC TANK DUMP VALVE MECHANISM

Elwood P. Wenzelberger, Dayton, Ohio, assignor to The Commonwealth Engineering Company of Ohio, Dayton, Ohio, a corporation of Ohio Application July 19, 1954, Serial No. 444,069

8 Claims. (Cl. 62—114)

This invention relates to an apparatus for use in dehydration equipment for freeze dehydrating heat-sensitive liquid bearing solids, the invention being more particularly concerned with an improved freeze tank mechanism having a quick opening closure therefor to provide rapid and efficient emptying of the freeze tank after the freezing cycle has been completed.

It is an object of the invention to provide a quick opening mechanism for freeze concentration tanks which may be either manually or automatically operated to quickly release the ice slurry liquid from the freezing tank.

Another object of the invention is to provide a closure for the bottom of a freezing tank which is operable for rapid release of the frozen slurry and prevents leakage and spillage of the material delivered from the tank.

Another object of the invention is to provide a quick opening mechanism for installation at the bottom of freeze dehydration tanks of this character to provide an improved closure which is sealed against leakage but which can be quickly operated to release all of the contents in the tank in the shortest period of time, said closure mechanism being automatically adjustable to conform with the opening at the bottom of the tank and prevent leakage of the tank during the freezing cycle.

It is a further object of the invention to provide mechanism for dumping the contents of a freezing tank automatically at the end of a predetermined freezing cycle so that the entire contents of the tank containing ice particles which tend to cling together, causing the same to be dispersed and released from the mother liquid.

The invention is particularly useful to provide automatic or push button control of the emptying of the freeze tanks during freeze dehydration of liquid containing solids such as citrus and fruit juice which are to be dehydrated by freezing. In this process, a juice to be dehydrated is conveyed to a tank containing tubes for receiving refrigerant and the freezing period is allowed in order to produce a crop of pure ice crystals, the cycle being limited to a time sufficient for the freezing point of a solution to be lowered to approximately the temperature in the tank, which temperature is just sufficient to cause the formation of ice crystals throughout the liquid. During the freezing treatment the juice or liquid being refrigerated is thoroughly agitated and the ice crystals formed are kept dispersed throughout the liquid.

In accordance with the freeze dehydration process the temperatures are carefully controlled and progressively lowered at each successive stage of freezing cycles. For example, it has been found that in order to prevent the ice crystals formed during the freezing from occluding substantial amounts of the solution or juice being treated, it is necessary to keep the juice thoroughly stirred and to maintain a small differential of temperature between the refrigerant and the juice. It has been found in this connection that the successive stages of freezing treatment should be held to small differential temperature such as about 5–7° F. and that the temperature of the liquid or juice being treated in the second stage and subsequent stages should be approximately the temperature of the refrigerant in the succeeding stage, and so on. These differentials in temperature will, of course, vary somewhat with the material being treated, but the principle of the operation remains the same.

In order to obtain fine ice crystals in a relatively pure form without occluding substantial amounts of the solids, the temperature of the cooling liquid is kept practically constant, the temperature being maintained at a predetermined lower temperature in each stage of freezing and just below the ice forming temperature of the solution.

In the freeze dehydration system utilizing the tanks as described, it has been found important to provide for rapid and quick discharge or emptying of the freeze tank. If the slurry of partially frozen liquid is not quickly discharged from the freeze tank there is a tendency for the ice particles to coalesce and block the operation. This not only disrupts the process but is economically disadvantageous because of the loss of time in the use of the freezing tank. Further, the quick opening freeze tank in cooperation with the stirrer functions to prevent or overcome any coalescing or sticking together of the ice particles during operation of the freeze dehydration tank.

The further advantages and improvements will be apparent from the following description taken in connection with the drawing wherein—

Figure 1:
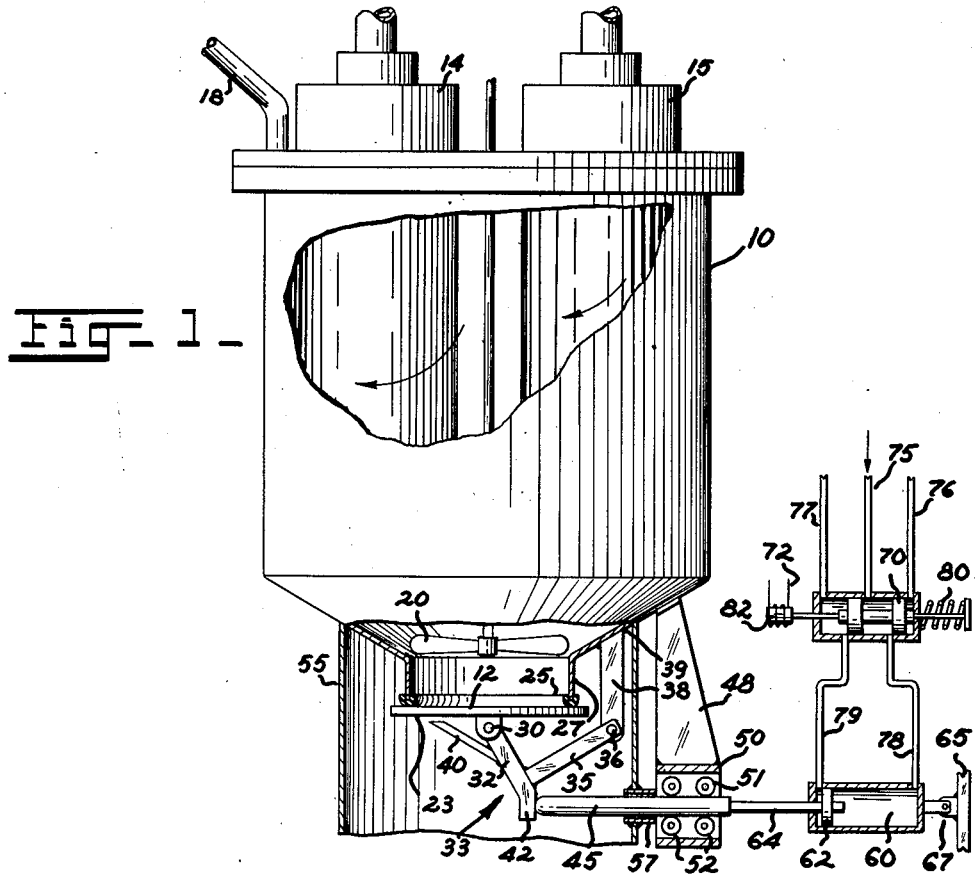
Figure 1 is an elevational view of a freezing tank for use in freeze dehydrating liquids containing solids such as fruit and vegetable juices, in accordance with this invention, the tank being equipped with a quick opening closure embodying this invention, the parts being shown partly in section to better illustrate the construction and operation thereof.

Referring to the drawing in detail, the reference character 10 designates a freezing tank which terminates in an opening 12 in the bottom thereof. In order to provide an opening sufficiently large to permit rapid discharge of the contents of the tank, the diameter of the opening is preferably made approximately one-half the diameter of the tank.

The freezing tank 10 is constructed and operated as disclosed and described in my copending application Serial No. 196,686, filed November 8, 1950, now Patent No. 2,723,539, granted November 15, 1955, for Method and Apparatus for Dehydration of Liquid by Freezing.

The freeze tank comprises one or more refrigerant containing tubes such as shown diagrammatically at 14 and 15. The refrigerant is suitably admitted to the freezing tubes 14 and 15 to effect refrigeration of the liquid bearing solids which are admitted through a central conduit 18 and circulated about the freezing tubes, as indicated by the arrows in Figure 1.

The juice which has been admitted to the freeze tank through the conduit 18 is kept agitated by a propeller type stirrer 20 arranged to operate in the lower portion of the freezing tank, as shown in Figure 1, the stirrer being operated to keep the mixture being refrigerated thoroughly stirred. This vigorous stirring assists in the freezing out of the water as small, fine ice crystals and in addition provides for propulsion of the icy slurry mass through the discharge opening 12 in the bottom of the freezing tank when the freezing cycle has been completed.

The opening 12 at the bottom of the tank is closed by a quick opening closure or cover 23 which functions as a quick acting self-aligning valve. The cover 23 is arranged to fit snugly against the annular gasket 25 positioned on the lower depending edge portion of the cylindrical-shaped section 27 of the tank. The cover 23 is moved vertically when sealing and is brought into cover position against the gasket so that the cover is pressed thereagainst evenly around the periphery of the cover.

Figure 2:
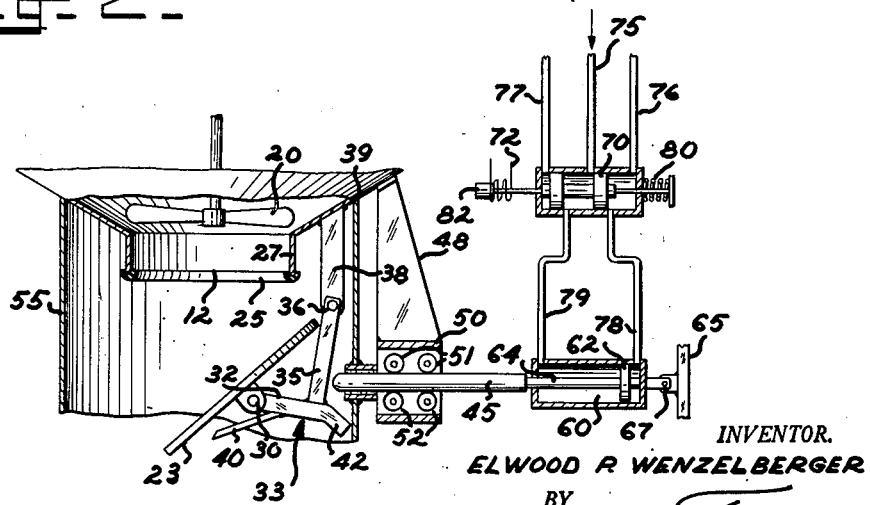
Figure 2 is a fragmentary view similarly as Figure 1, illustrating the closure in its full open position.

The structure providing for quick opening and closing of the cover is illustrated in Figures 1 and 2. To support the cover the same is hinged centrally, as at 30, and pivotally secured to the upper arm member 32 of a Y-shaped pivoting member generally indicated at 33. The upper end of the other arm 35 is pivotally secured as at 36 to the lower end of the stationary frame member 38 which is suitably secured at its upper end, as by welding 39, to the bottom of the tank. Stop bar 40 is carried by the arm 32 and arranged to prevent swinging of the cover out of position to be moved into engagement with the annular gasket 25.

The lower leg portion 42 of the Y lever 33 is adapted to be engaged by a plunger 45, which plunger is reciprocated to effect quick opening and closing of the cover. For initiating return of the closure of the cover 23, the plunger 45 contacts the lower portion of arm 35, as illustrated in Figure 2, and as the arm pivots about the pivot 36, the plunger slidably engages the leg portion 42 to press the cover closed, as shown in Figure 1. This plunger 45 is supported by a bracket member 48 secured to the bottom of the tank. Bracket 48 comprises a roller bearing assembly 50 having top and bottom rollers 51 and 52 for rollably supporting and guiding the plunger 45. The plunger 45 is arranged to pass through the cylindrical skirt member or canopy 55 arranged about the opening, as shown in Figures 1 and 2. A guide bushing 57 is provided for supporting the plunger 45, which bushing is arranged in the side wall of the skirt or canopy 55.

For reciprocating the plunger 45 to pivot the swinging Y member 33 about its pivot member 36 to open and close the cover there is utilized an air cylinder 60. This air cylinder comprises a piston 62 which is attached at its outer end through the piston rod 64 to the plunger 45. The cylinder 60 is pivotally supported to a stationary frame or wall member 65, the same being pivoted thereto, as at 67.

For operating the piston a reciprocable piston valve member 70 is provided, as illustrated on Figures 1 and 2, the same being preferably operated by electrical means 72. Air pressure is admitted to the conduit 75 and discharged at the opposite ends through the conduits 76 and 77 respectively, interconnecting conduits 78 and 79 to the reciprocable piston valve member 70. By utilizing a spring means 80 the piston valve 70 is urged to be moved in one direction while the solenoid member 82 connected at the opposite end of the piston valve is adapted to move the piston against the action of the spring 80 to position the piston valve as required to cause shifting of the plunger to release the cover and permit it to swing open, and to force the cover to its closed position.

The thrust on the plunger in the direction shown is thus kept horizontal at all times under the load. This eliminates any lateral strain or flexing of the rod which would cause the mechanism to jam or stick when the cover is opening or closing. The pivoted arrangement of the Y member and cooperating roller supported plunger and pivoted air cylinder which actuates the plunger is thus arranged so that there is a minimum of friction and the mechanism exerts no load on the plunger other than the weight of the cover plate.

The full load on the plunger is applied only when the cover plate is in the fully closed position at which time the contact of the plunger against the Y arm portion 42 lies in a horizontal plane and the force applied against the flat face thus offers no opportunity for jamming to occur when the plunger is withdrawn to the right to permit the cover to swing open by gravity and under the load of the material, as shown in Figure 2.

The construction as provided permits a full open position to be accomplished in a matter of a fraction of a second upon retraction of the plunger 45, as illustrated in Figure 2, and the cover in its fully open position forms a guide for the icy slushy mass so that the same does not contact the plunger and associated mechanism which actuate the cover. In addition to the weight of the material in the tank tending to force open the cover plate 23, the propeller blade 20 operates to add a propulsion force which causes the cover 23 to open quickly upon retraction of the plunger 45.

The load of the slushy material is readily sustained by the cover. A lightweight cover is preferably utilized which may be made of aluminum, magnesium, or fabricated from their alloys, or the same may be fabricated from stainless steel, particularly where corrosion is a problem.

In accordance with the invention there is provided a quick opening closure for the refrigerating tanks so that the frozen slurry mass can be practically instantaneously discharged from the tank, the gravitational force of the mass in the tank being sufficient to disintegrate any particles of ice crystals which may cling together. If desired fluid pressure may be admitted to the tank to blow the material out, however, this is generally not necessary due to the utilization of the propeller, which blades assist in discharging the fluid in the tank so as to produce the desired results.

It will be understood that the invention may be varied in the details of structure and that substitution of parts may be made by those skilled in the art without departing from the spirit and scope of the invention, and as more fully set forth in the appended claims.

What is claimed is:

1. In a refrigerator tank for freeze dehydrating heat-sensitive liquid bearing solids, freezing compartments in said tank, stirrer means arranged in said tank beneath said freezing compartments, a discharge opening at the bottom of said tank, annular gasket means disposed about said opening, cover means comprising a plate which is pivoted and adapted to be swung to and from said opening to open and close the same, said cover means comprising a Y-shaped lever having one arm pivotally attached to said cover and the other arm pivotally attached to said tank, and reciprocable plunger means for swinging said Y member about its pivot to move said cover into position to close said tank opening, said plunger releasably holding said cover in closed position.

2. In a refrigerator tank for freeze dehydrating heat-sensitive liquid bearing solids freezing compartments in said tank, stirrer means attached in said tank beneath said freezing compartments, a discharge opening at the bottom of said tank, cover means for closing said discharge opening, said cover means comprising a swingable plate which is self-adjustable against said opening, and means comprising a Y-shaped lever, a bracket attached to said tank, and a plunger, said Y-shaped member having one arm pivotally attached to said cover and the other arm pivotally attached to said bracket, and means for reciprocating said plunger into contact with said Y-shaped member to cause the same to swing upwardly and position the cover against said discharge opening, said plunger releasably holding said cover in closed position.

3. In a refrigerator tank for freeze dehydrating heat-sensitive liquid bearing solids, freezing compartments in said tank, stirrer means attached in said tank beneath said freezing compartments, a discharge opening at the bottom of said tank, cover means for closing said discharge opening, said cover means comprising a swingable plate which is self-adjustable against said opening, and means comprising a Y-shaped lever, a bracket attached to said tank, a plunger, said Y-shaped member having one arm pivotally attached to said cover and the other arm pivotally attached to said bracket, means for reciprocating said plunger into contact with said Y-shaped member to cause the same to swing upwardly and position the cover against said discharge opening, said plunger releasably holding said cover in closed position, and piston means for actuating said plunger to swing the cover to closed position.

4. In a refrigerator tank, for freeze dehydrating heat-sensitive liquid bearing solids, freezing compartments in said tank, stirrer means attached in said tank beneath said freezing compartments, a discharge opening at the bottom of said tank, cover means for closing said discharge opening, said cover means comprising a swingable plate which is self-adjustable against said opening, and means comprising a Y-shaped lever, a bracket attached to said tank, a plunger, said Y-shaped member having one arm pivotally attached to said cover and the other arm pivotally attached to said bracket, means for reciprocating said plunger into contact with said Y-shaped member to cause the same to swing upwardly and position the cover against said discharge opening, said plunger releasably holding said cover in closed position, piston means for actuating said plunger to swing the cover to closed position, and means for electrically controlling the operation of said piston for actuation of said plunger, whereby upon retraction of said plunger said cover is allowed to swing away from said opening by gravity and into a position to permit full opening of the tank.

5. A gravity opened closure mechanism for an opening in the bottom of a tank, said mechanism comprising a closure plate which is of a size and shape to cover said tank opening, means comprising a pair of levers secured together and to said cover, bracket means secured to said tank, means for pivotally securing one of said levers to said bracket and the other of said levers to said cover, and means comprising a plunger adapted to be moved into slidably pushing engagement with said pair of levers to position said plate against said tank opening for closing the same, means for reciprocating said plunger away from said lever to permit said cover to swing away from said tank opening by gravity, and means carried by said levers for limiting the pivoting movement of said cover with respect to said levers.

6. A gravity opened closure mechanism for an opening in the bottom of a tank, said mechanism comprising a closure plate which is of a size and shape to cover said tank opening, a propeller stirrer means in the bottom of said tank, means comprising a Y-shaped lever and bracket means, said bracket being attached to the wall of said tank adjacent said opening, said Y-shaped member being pivotally secured to said bracket means and to said cover, means comprising a plunger supported for movement into slidably pushing engagement with the lower extremity of said Y-shaped member to pivot the same about said bracket means and position the cover against said opening, and means for reciprocating said plunger away from said Y-shaped member to release the cover and permit the same to swing away from said tank opening and about said bracket means under the influence of the force of gravity and force created by said propeller stirrer.

7. A gravity opened closure mechanism for an opening in the bottom of a tank, said mechanism comprising a closure plate which is of a size and shape to cover said tank opening, means comprising a Y-shaped lever and bracket means, said bracket being attached to the wall of said tank adjacent said opening, said Y-shaped member being pivotally secured to said bracket means and to said cover, means comprising a plunger supported for movement into slidably pushing engagement with the lower extremity of said Y-shaped member to pivot the same about said bracket means and position the cover against said opening, means for reciprocating said plunger away from said Y-shaped member to release the cover and permit the same to swing away from said tank opening and about said bracket means, and piston means which is fluid actuated for reciprocating said plunger to close and quickly release said cover to permit the same to be swung open by gravity.

8. A gravity opened closure mechanism for an opening in the bottom of a tank, said mechanism comprising a closure plate which is of a size and shape to cover said tank opening, means comprising a Y-shaped lever and bracket means, said bracket being attached to the wall of said tank adjacent said opening, said Y-shaped member being pivotally secured to said bracket means and to said cover, means comprising a plunger supported for movement into slidably pushing engagement with the lower extremity of said Y-shaped member to pivot the same about said bracket means and position the cover against said opening, means for reciprocating said plunger away from said Y-shaped member to release the cover and permit the same to swing away from said tank opening and about said bracket means by force of gravity, piston means which is fluid actuated for reciprocating said plunger, means for electrically controlling the positioning of said plunger to effect the opening and closing of said tank, and a propeller blade stirrer disposed in said tank and adjacent said tank opening which is adapted to propel the contents of said tank out of said opening upon release of said cover.

References Cited in the file of this patent

UNITED STATES PATENTS

| | | |
|---|---|---|
| 633,207 | Miles | Sept. 10, 1899 |
| 796,264 | Stuebner | Aug. 1, 1905 |
| 1,615,878 | Laird | Feb. 1, 1927 |
| 1,694,369 | Burdick | Dec. 11, 1928 |
| 2,448,802 | Holzker | Sept. 7, 1948 |
| 2,552,525 | Wenzelberger | May 15, 1951 |
| 2,639,144 | Long | May 19, 1953 |

FOREIGN PATENTS

| | | |
|---|---|---|
| 387,460 | France | July 10, 1908 |